No. 749,074. PATENTED JAN. 5, 1904.
H. MARTINI.
STOPPERING DEVICE FOR PRESERVE JARS OR THE LIKE.
APPLICATION FILED JULY 29, 1903.
NO MODEL.
3 SHEETS—SHEET 1.

No. 749,074. PATENTED JAN. 5, 1904.
H. MARTINI.
STOPPERING DEVICE FOR PRESERVE JARS OR THE LIKE.
APPLICATION FILED JULY 29, 1903.
NO MODEL. 3 SHEETS—SHEET 3.

No. 749,074. Patented January 5, 1904.

UNITED STATES PATENT OFFICE.

HERMANN MARTINI, OF RIGA, RUSSIA.

STOPPERING DEVICE FOR PRESERVE-JARS OR THE LIKE.

SPECIFICATION forming part of Letters Patent No. 749,074, dated January 5, 1904.

Application filed July 29, 1903. Serial No. 167,437. (No model.)

*To all whom it may concern:*

Be it known that I, HERMANN MARTINI, a subject of the Emperor of Austria-Hungary, residing at No. 7 Arsenalstrasse, Riga, Russia, have invented a new and useful Stoppering Device for Preserve-Jars or the Like, of which the following is a specification.

This invention relates to a stoppering device for vessels for preserving liquid alimentary products or such solid products as are kept in a liquid medium, the main object of the invention being to provide means whereby the air may be exhausted at any time from the filled and closed vessel without the employment of heat. This end is attained by providing an elastic arched cover which is intended to be fixed upon the vessel having a dome furnished with an opening at its upper portion and fitting upon this dome a casing in which a valve is placed, while beneath this latter an elastic float is arranged in the dome in a capsule removably fitting in this latter. By exhausting the air from the space contained between the cover and the contents of the vessel the cover will be caused to sink, owing to the pressure of the outer air, and the cover will be pressed upon the liquid in such a manner that any escape of liquid from the vessel is prevented by the float, and any admission of air to the vessel is prevented by the valve.

Two methods of carrying the invention into practice are illustrated in the accompanying drawings, in which—

Figures 1 to 11 and Figs. 15 and 16 show the separate parts of the stoppering or closing device, and Figs. 12 to 14 and Figs. 17 and 18 the parts when assembled.

Figure 1:
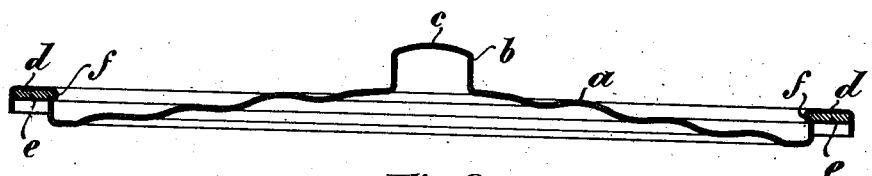
Figure 2:
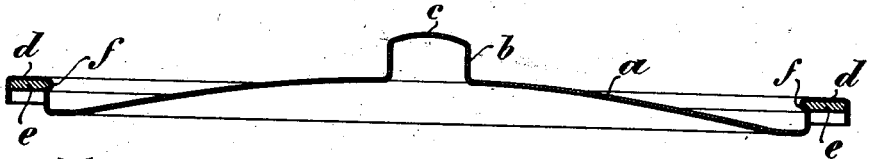
Figure 4:
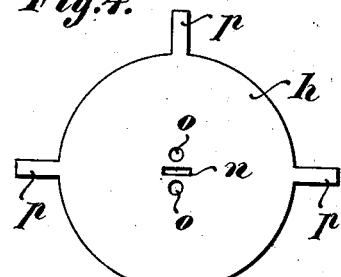

The stoppering device consists, in the first place, of a circular or rectangular cover $a$ of arched form, Figs. 1 and 2, which is provided at its middle part with a cylindrical dome $b$, the upper end or closing-surface of which is preferably arched outward and provided with an opening $c$. From the dome $b$ to the raised edge $d$ the cover $a$ may be either undulated or flat in cross-section; but in any case it should present the properties of an elastic membrane. The edge $d$ of the cover $a$ is formed into a groove or channel, at the bottom of which an elastic packing-ring $e$ is placed, which upon its inner side presses against the widened bottom $f$ of the channel, thus preventing it from falling out of this latter.

$g$ is a casing or tubular cap which is passed over the dome $b$. It is provided with a flange $k$, Fig. 3, upon which is placed an elastic packing-ring $i$, secured to the tubular part of the cap by a circular plate $h$, Fig. 4, upon the periphery of which are provided lugs $p$, which are bent downwardly to seize the flange. The plate $h$ is provided at its middle part with openings $n$ and $o$. A capsule $l$ is inserted beneath the dome by means of spring portions $m$, formed from its cylindrical wall and holds tightly against the inner wall of the dome, Figs. 3 and 5. The bottom of the capsule $l$ is provided with one or more openings $c'$.

Figure 6:
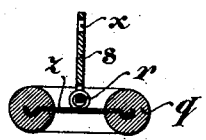
Figure 8:
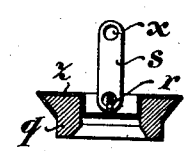
Figure 3:
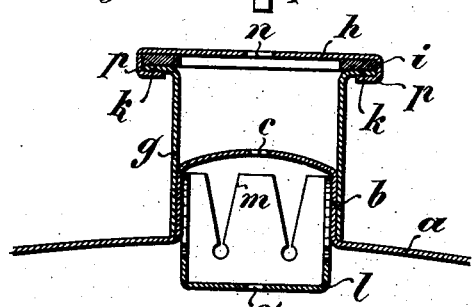
Figure 5:
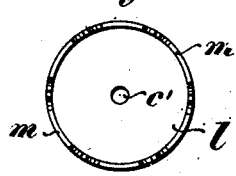
Figure 7:
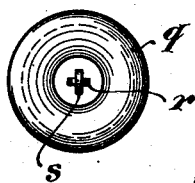

The elastic ring of the valve $q$, Figs. 6, 7, 8, 9, is either fixed air-tight around a disk $z$, Fig. 6, or a disk $z$ seizes the valve-ring in an air-tight manner, Fig. 8. To the upper side of the disk $z$ an eye $r$ is attached, in which a rod $s$ is suspended, the free extremity of this rod being provided with a hole $x$.

Figures 9, 10:
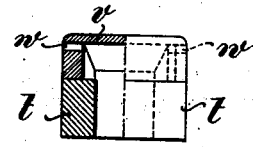
Figure 11:
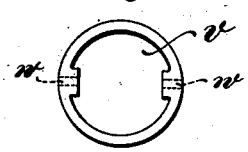

The cylindrical float $t$, Figs. 10 and 11, is formed of a material which is specifically lighter than the liquid to be preserved and is furnished at its middle part with an opening which opens out upwardly funnelwise. The float carries above the widened extremity an elastic plate $v$, furnished with two horizontal apertures $w$.

Figure 12:
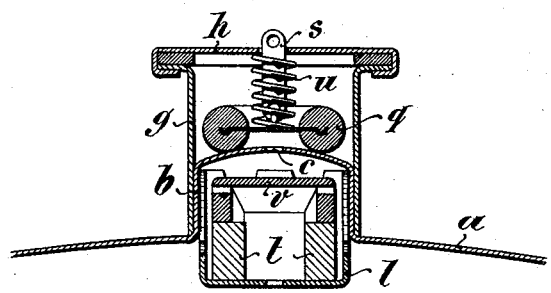
Figure 13:
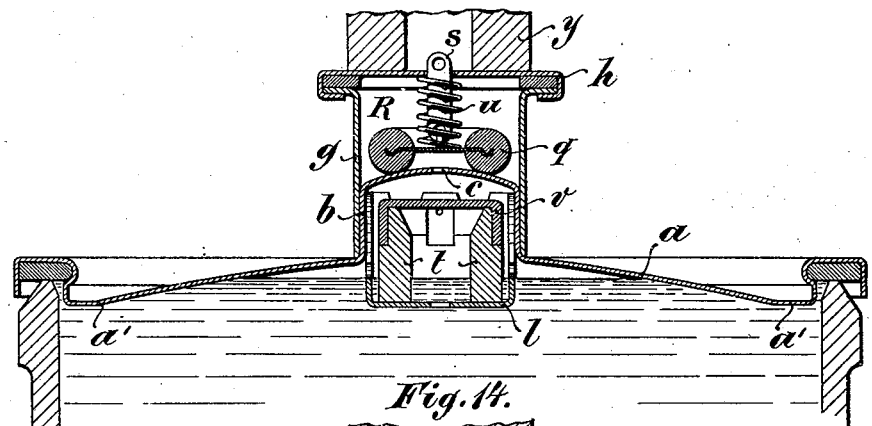
Figure 14:
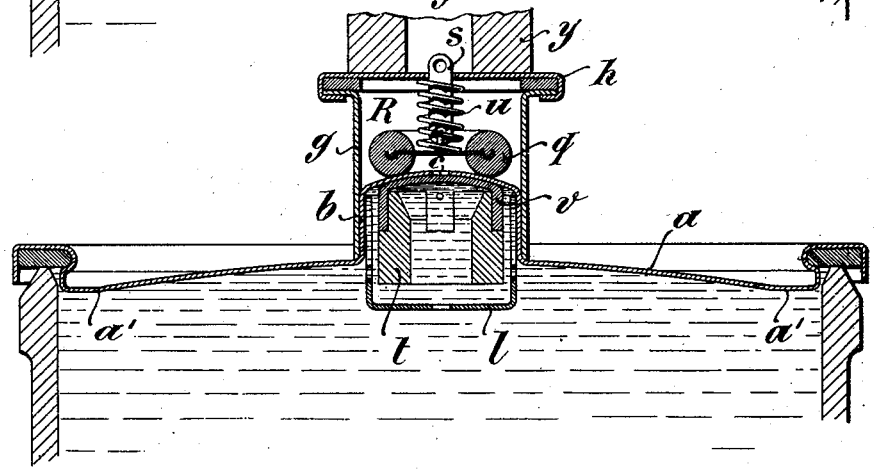
Figure 15:
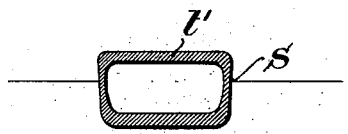
Figure 16:
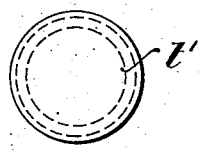
Figure 17:
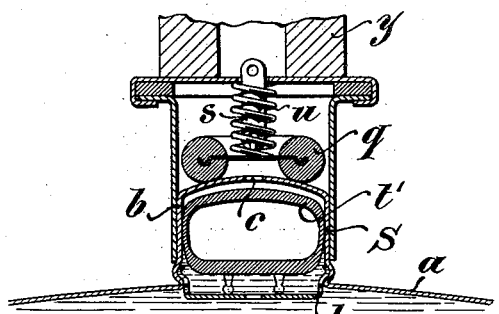
Figure 18:
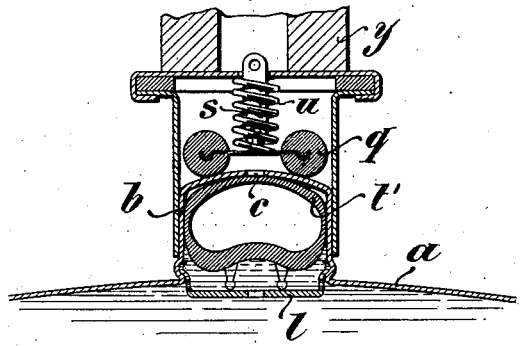

Figs. 12, 13, and 14 show the parts above described when assembled. The valve $q$ is seated above the opening $c$ upon the arched closing-surface of the dome $b$ and is constantly held down by means of a spiral spring $u$, which bears against the plate $h$. The float $t$ lies with the plate $v$ upward in the capsule $l$. The assembled closing device, Fig. 12, is pressed upon the edge of the preserving jar or other vessel, which is filled up to a certain level, Fig. 13, and owing to the edge $a'$ of the cover $a$, which enters the liquid, this latter rises about half-way up the arch of the cover. Upon the plate $h$ a tube $y$ is then pressed, forming an air-tight tubular connection between the valve-chamber R and an air-pump operated either by hand or by a suitable motor. By means of this pump the air is exhausted out of the valve-chamber R and from the space between the liquid and the arch of the cover-plate. As soon as the air pressure beneath the arch of the plate falls the elastic cover $a$ will sink by effect of the atmospheric pressure until it presses upon the liquid, so that this latter will rise in the dome. The weight of the float $t$ is calculated in such a manner that the plate $v$ when the float is placed in the liquid extends slightly beyond the surface of the liquid. When the liquid has risen sufficiently in the dome, the float will be lifted, the upper part of its elastic plate first of all pressing against the arch of the dome $b$, and upon further exhaustion of the air the plate $v$ adapts itself completely to the curvature of the dome, so that the liquid when the air is driven out automatically blocks its own passage through the valve-chamber R, Fig. 4. The valve $q$ is then firmly seated, owing to the pressure of the spring $u$ and of atmospheric air, over the opening $c$, and owing to atmospheric pressure the whole device will be pressed with considerable force upon the edge of the vessel. The pressure with which the stoppering device is held upon the vessel will vary, according to the elasticity of the cover $a$—that is to say, according to the greater or less resistance which it opposes to bending. The elastic tube $y$ is then removed from the plate $h$, and the filled vessel is ready for storing. Means may also be provided for locking the seated valve so as to prevent its becoming untight by concussions on transport. When it is desired to open the vessel, it is only necessary to pull upon the rod $s$, if desired, exerting leverage by means of the prong of a fork or by pulling with a string inserted in the opening in the rod projecting from the plate $h$. When the valve $q$ is open, the cover becomes upwardly arched, and the stoppering device may be readily removed from the vessel without damaging a movable part or the packing-ring $e$. The separate parts of the device may be readily cleaned, as by bending up the lugs $p$ and removing the plate $h$, which is easily renewed. The valve $q$ may speedily be removed from the valve-chamber R and the float $t$ by pulling the capsule. After cleaning and reassembling the device is ready for immediate use.

In Figs. 15 to 18 of the drawings another constructional form of the float is illustrated, this float consisting of an elastic body filled with air. This float $t'$ is formed with walls of unequal thickness, their weakest cross-section being on the liquid-level S, Fig. 15. The operation is briefly as follows: The float $t'$ is inserted in the dome $b$ in the manner already described with reference to the float $t$ and prevented from falling out of the same by the capsule $l$. When the vessel has been suitably filled and the closing device placed thereon, the air is exhausted from the space comprised between the cover $a$ and the liquid in the manner already explained. When the cover $a$ has sunk to such an extent that the rising liquid lifts the float somewhat, there will already be a certain vacuum, owing to which the air inside the float will expand in such a manner that the volume of the float is increased, this taking place first of all at the place where the thickness of the wall of the float is least—that is to say, on the liquid-level S, Fig. 17. This expanding wall of the float is now tightly pressed against the cylindrical wall of the dome $b$, thus inclosing the liquid in an air-tight manner. If the exhaustion of the air is continued, the float $t'$ will be pressed upward in the manner of a piston and its upper portion will come against the opening $c$, Fig. 18.

What I claim, and desire to secure by Letters Patent of the United States, is—

1. A closing device for preserve-jars and the like vessels, comprising an elastic arched cover to be fixed on the vessel, the combination of a dome on the cover furnished with an opening at its upper portion, with a cap or casing adapted to be passed over the dome with openings in the cover-plate, a valve placed inside such casing, and an elastic float arranged inside the dome, substantially as and for the purpose stated.

2. In a closing device for preserve-jars and the like vessels comprising an elastic arched cover to be fixed on the vessel, the combination of a dome on the cover furnished with an opening at its upper portion with a cap or casing adapted to be passed over the dome and consisting of a flanged tubular portion, a packing-ring placed on such flange, and top plate provided with an opening in the middle and lugs at the periphery, a valve inside the said casing or cap and an elastic float arranged underneath the dome, substantially as and for the purpose stated.

3. In a closing device for preserve-jars and the like vessels comprising an elastic arched cover to be fixed on the vessel, the combination of a dome on the cover furnished with an opening at its upper portion, with a cap or casing adapted to be passed over the dome, and provided with an opening or openings in the cover-plate, a valve placed inside the dome adapted to close the opening in the dome by atmospheric pressure acting on the valve, and an elastic float arranged underneath the dome, substantially as and for the purpose stated.

4. In a closing device for preserve-jars and the like vessels comprising an elastic arched cover to be fixed on the vessel, the combination of a dome on the cover furnished with an opening at its upper portion, with a casing adapted to be passed over the dome and provided with an opening or openings in the cover-plate, a valve placed inside the dome adapted to close the opening in the dome by atmospheric pressure, a rod attached to the upper side of the valve and an elastic float arranged underneath the dome, substantially as and for the purpose stated.

5. In a closing device for preserve-jars and the like vessels comprising an elastic cover to be fixed on the vessel, the combination of a dome on the cover furnished with an opening at its upper portion, a cap adapted to be passed over the dome and provided with an opening or openings in the cover-plate, a valve placed inside the cap, a capsule adapted to be removably fitted in the dome and an elastic float arranged inside the capsule, substantially as and for the purpose stated.

In testimony whereof I have hereunto set my hand in presence of two subscribing witnesses.

HERMANN MARTINI.

Witnesses:
A. V. DÖLMBERG,
ARTHUR BULLES.